ated Dec. 25, 1973

United States Patent [19]
Mankowsky et al.

[11] 3,781,160
[45] Dec. 25, 1973

[54] PREFILL VALVE FOR MOLDING MACHINES

[75] Inventors: Vincent J. Mankowsky, Westchester; Clarence J. Ceroke, Homewood, both of Ill.

[73] Assignee: U.S. Industries, Inc., New York, N.Y.

[22] Filed: Feb. 2, 1971

[21] Appl. No.: 111,929

[52] U.S. Cl............ 425/450, 425/150, 425/DIG. 223
[51] Int. Cl................................................ B29h 5/24
[58] Field of Search................ 18/30 LV; 425/150, 425/450, DIG. 223

[56] References Cited
UNITED STATES PATENTS
3,084,512   4/1963   Huelskamp.................. 425/450 UX
3,456,297   7/1969   Andreasson.................. 425/450

*Primary Examiner*—H. A. Kilby, Jr.
*Attorney*—Johnston, Root, O'Keeffe, Keil, Thompson & Shurtleff

[57]   ABSTRACT

A prefill valve assembly for a hydraulically actuated molding machine, including a poppet shiftable axially within a valve cylinder between open and closed positions, wherein fluid pressure from the main hydraulic circuit is used to move the poppet to closed position rapidly, thereby reducing the overall cycle time of the machine.

8 Claims, 5 Drawing Figures

PATENTED DEC 25 1973 3,781,160

INVENTORS:
VINCENT J. MANKOWSKY
CLARENCE J. CEROKE

BY: Johnston, Root, O'Keeffe, Keil, Thompson & Shurtleff
ATT'YS

INVENTORS:
VINCENT J. MANKOWSKY
CLARENCE J. CEROKE
BY: Johnston, Root, O'Keeffe, Keil, Thompson & Shurtleff
ATT'YS

PREFILL VALVE FOR MOLDING MACHINES

BRIEF SUMMARY OF THE INVENTION

The invention relates generally to molding machines, and is directed more specifically to a novel form of prefill valve assembly designed to have extremely rapid closing action, thereby reducing the total cycle time of the machine.

In injection molding machines a main ram having a movable platen secured thereto, on which is mounted a mold half, is caused to reciprocate and be advanced to a mold-closed position and retracted to a mold-open position. The other mold half is mounted on a stationary platen and the main ram, which is advanced to close the mold halves, reciprocates within a main cylinder.

Booster or jack rams are customarily utilized for causing a rapid advance of the main ram toward its closed position. Such jack ram is common in prefill valves, and there is also utilized in combination therewith a poppet which is moved to a closed position to shut off the supply of hydraulic fluid from a reservoir to the main ram cavity within the ram cylinder.

In prior devices of this nature pilot hydraulic pressure has been used either to open and close the poppet, or to close the poppet when other means, such as a spring, is used to normally maintain the poppet in open position. In other constructions spring means have been used to urge the poppet to closed position, and illustrations of such prior art devices may be seen, for example, in the Norman et al. U.S. Pat. No. 2,878,648 issued Mar. 24, 1959, and in the Huelskamp U.S. Pat. No. 3,084,512 issued Apr. 9, 1963.

Closing and opening the poppet with pilot pressure or moving one way with pilot pressure and the other way with a spring is relatively slow compared to the device of the present invention. The present construction connects one side of the poppet to the main hydraulic circuit, and because of the comparatively high volume of hydraulic fluid in the main circuit, the poppet is caused to close more rapidly than the prior art structures, resulting in a decrease of the total cycle time.

As an illustrative example, it may be stated that, in a typical installation where the pilot hydraulic system pumps approximately 12 gallons per minute and the main hydraulic system pumps 155 gallons per minute, it takes approximately 3.4 seconds to close the poppet using pilot pressure, whereas a construction utilizing the pressure from the main hydraulic system to close the poppet requires only about 0.31 seconds, thereby decreasing the closing time, or increasing the speed thereof better than 10 times.

In view of the foregoing it is, therefore, a principal object of the present invention to provide a prefill valve assembly for a molding machine which operates more rapidly than has been possible heretofore, thereby reducing the cycle time of the machine.

Another object of the invention is to provide a prefill valve assembly wherein hydraulic pressure from the main hydraulic system is utilized for closing the valve, thereby causing a more rapid operation and a decrease in the cycle time of the machine.

Other objects and advantages of the invention will become apparent upon reading the following description taken in conjunction with the accompanying drawings, in which FIG. 1 is a longitudinal fragmentary sectional view through a clamp assembly of an injection molding machine embodying the present invention, and showing the main ram and the prefill valve in their idle positions;

Figure 2:
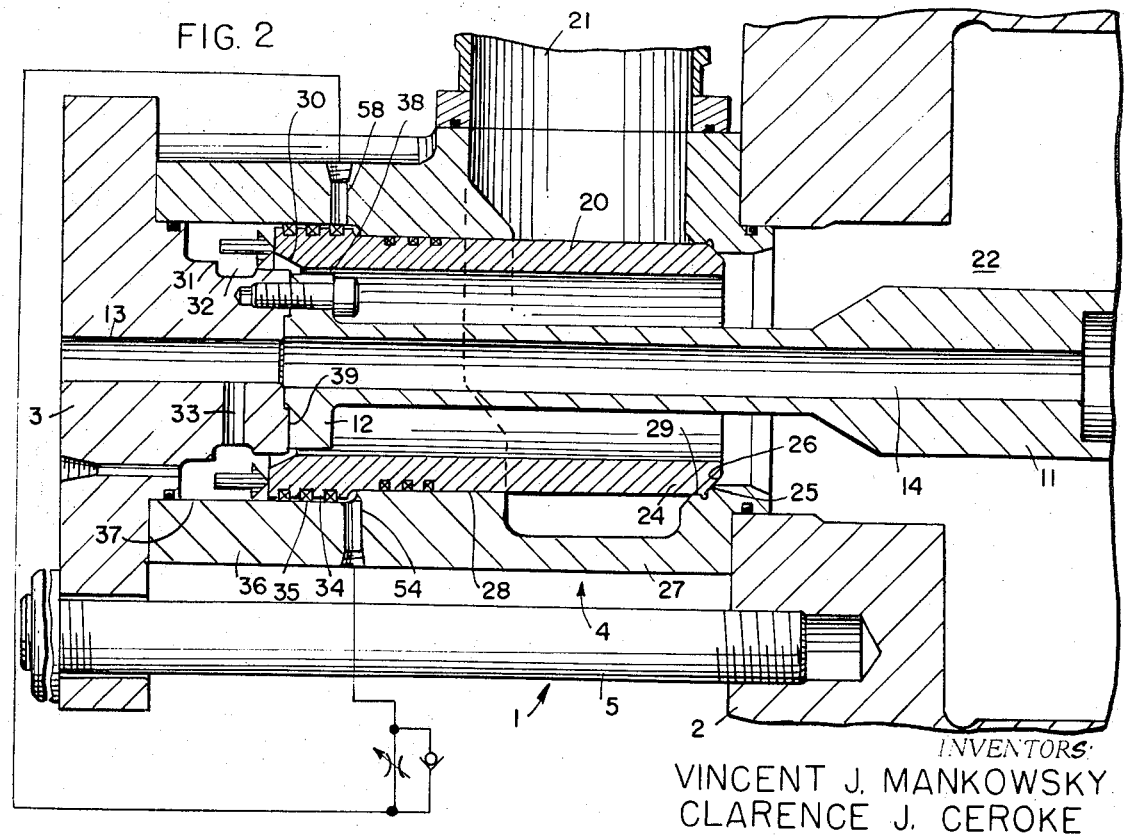
FIG. 2 is a view similar to FIG. 1 but showing the parts in their actuated or closed position.
Figure 3:
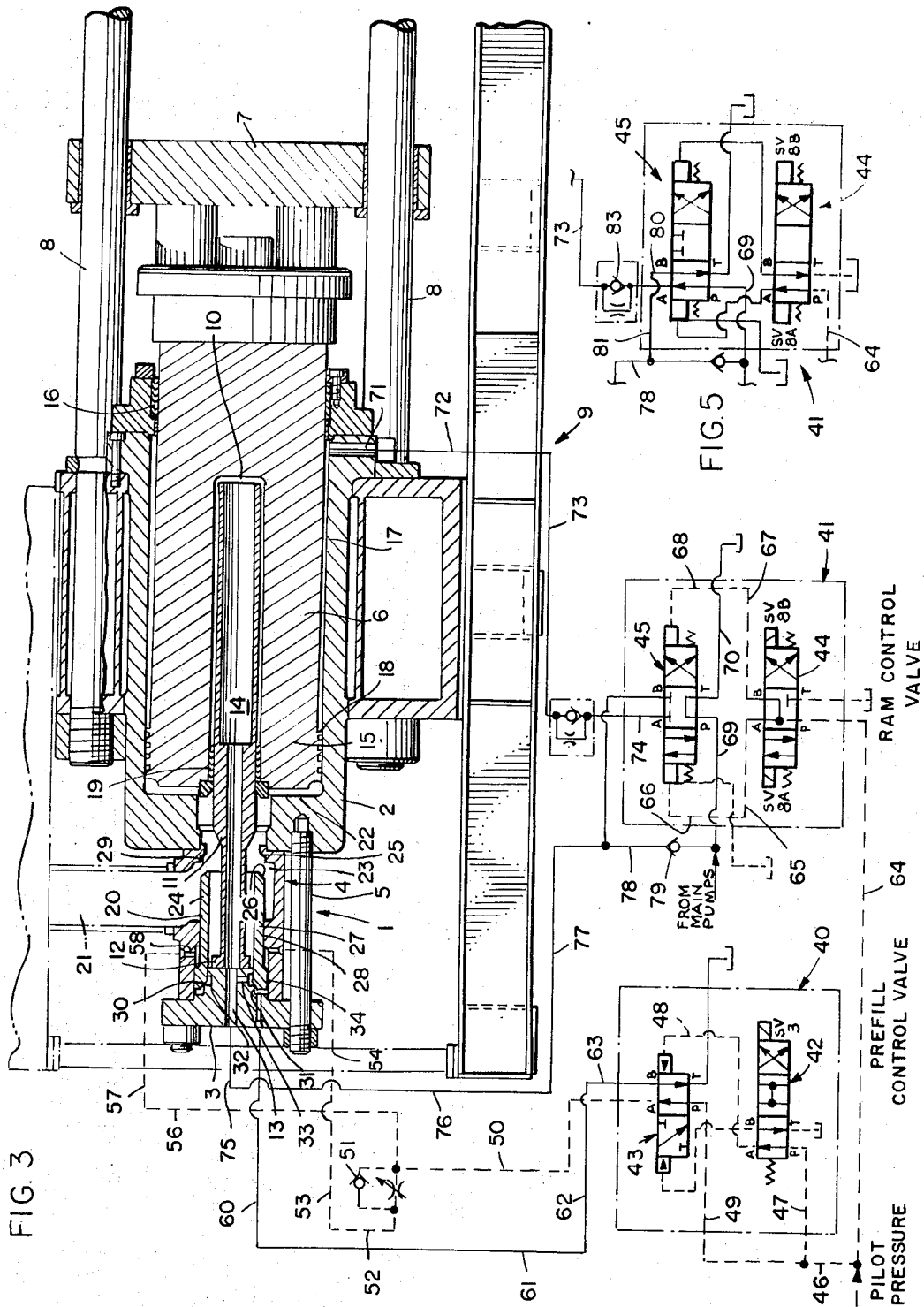
FIG. 3 is a longitudinal sectional view through the clamp assembly and prefill valve on a smaller scale, and showing the parts in their idle position as in FIG. 1, and including a diagrammatic illustration of the main and pilot hydraulic circuits with the valves thereof in a neutral or idle position.
Figure 4:
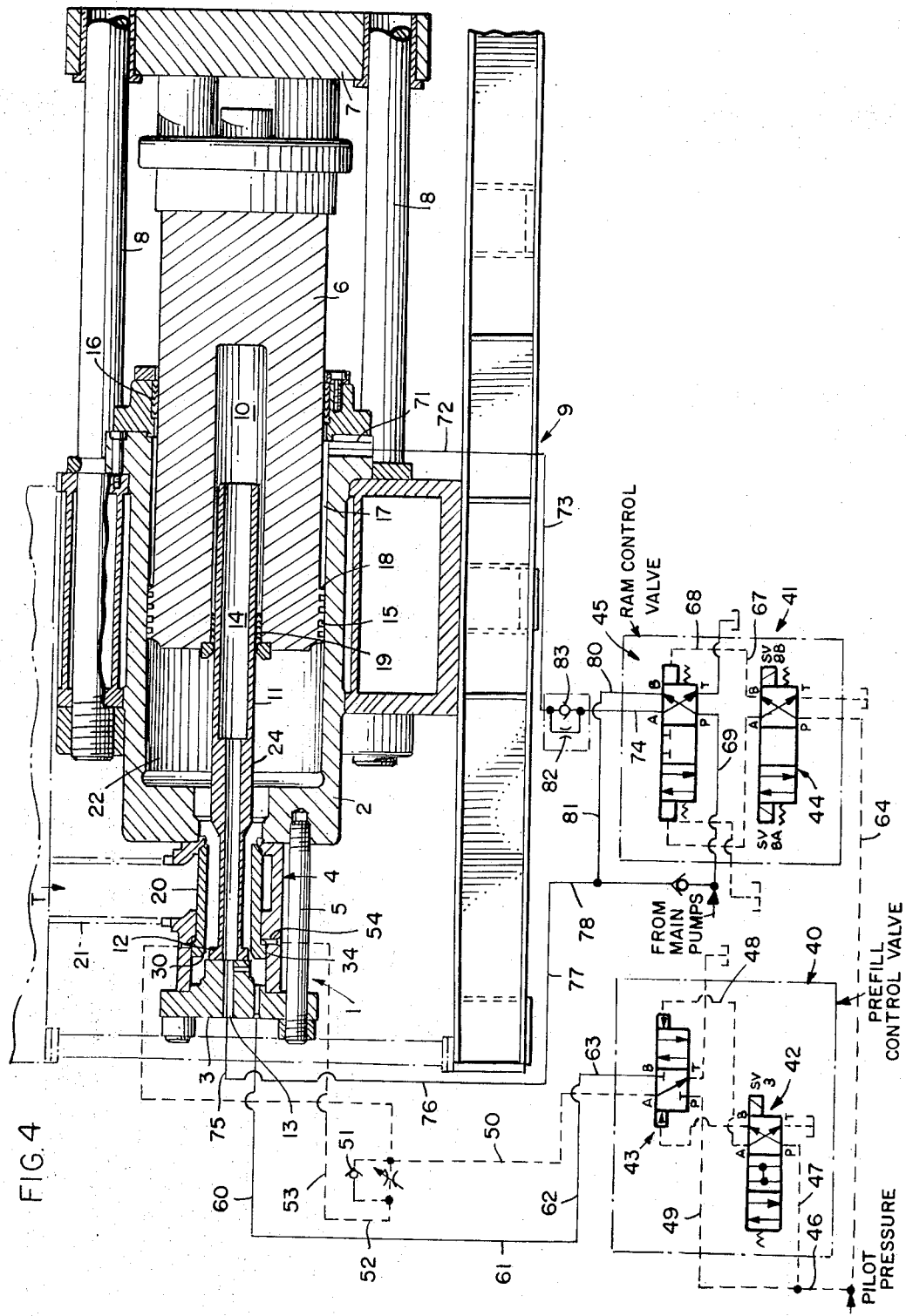

FIG. 4 is a view similar to FIG. 3 showing the various parts in their actuated positions as in FIG. 2, and the main and pilot hydraulic circuits with the valves thereof in the position which causes movement of the main ram and prefill valve to their actuated positions; and FIG. 5 is a diagrammatic illustration of the ram control valve and circuitry showing the positions of the valve spools after elapse of the proper curing time which cause retraction of the main ram and return of the prefill valve to their idle positions.

DETAILED DESCRIPTION

Referring now more particularly to the drawings, the prefill valve of the present invention is indicated generally by the numeral 1. The clamp assembly includes a main cylinder 2, a jack ram support 3 spaced therefrom, and between which is positioned a valve cylinder generally indicated at 4. These parts are secured together and the cylinder held between the main cylinder 2 and jack ram support 3 by means of a plurality of bolts 5.

A main ram 6 is located within the main cylinder 2 and is adapted to reciprocate within said cylinder between an advanced mold-closed position and a retracted mold-open position. As mentioned heretofore, the advanced position of the ram may be seen in FIG. 4 and the retracted position thereof is shown in FIG. 3.

The outer end of the main ram 6 has secured thereto a movable platen 7 on which a mold half (not shown) is adapted to be mounted. A plurality of guide rods 8 extend through suitable openings in the movable platen 7 and guide the reciprocation of the main ram to closed and open positions. The entire assembly is suitably mounted on a frame generally indicated at 9.

An elongated jack ram cavity 10 extends axially of the main ram 6 and is adapted to receive one end of a jack ram 11. The outer end 12 of the jack ram is suitably mounted on the jack ram support 3.

An axial passageway 13 extending through the jack ram support 3 communicates with an axial bore 14 extending through the jack ram 11. The jack ram is stationary and when hydraulic fluid under pressure from the main hydraulic circuit enters the passageway 13 and bore 14, the fluid will be forced out of the jack ram and against the end of the jack ram cavity 10 with sufficient force to advance the main ram 6 to its mold-closed position as shown in FIG. 4.

The main ram 6 is provided with suitable sealing rings 15 and glands 16 to prevent leakage of hydraulic fluid from around the main ram.

It will be noted that the main body of the main ram 6 has a smaller diameter than that of the main cylinder 2, thereby providing the annular space 17 between the ram and the cylinder. As will be pointed out more specifically hereinafter, fluid pressure from the main hydraulic circuit is utilized to retract the main ram by directing it into the annular space 17. The pressure of the fluid will be exerted against the annular shoulder 18 for this purpose.

The space between the jack ram 11 and the jack ram cavity 10 is also sealed against the passage of hydraulic fluid by suitable glands 19.

Figure 1:
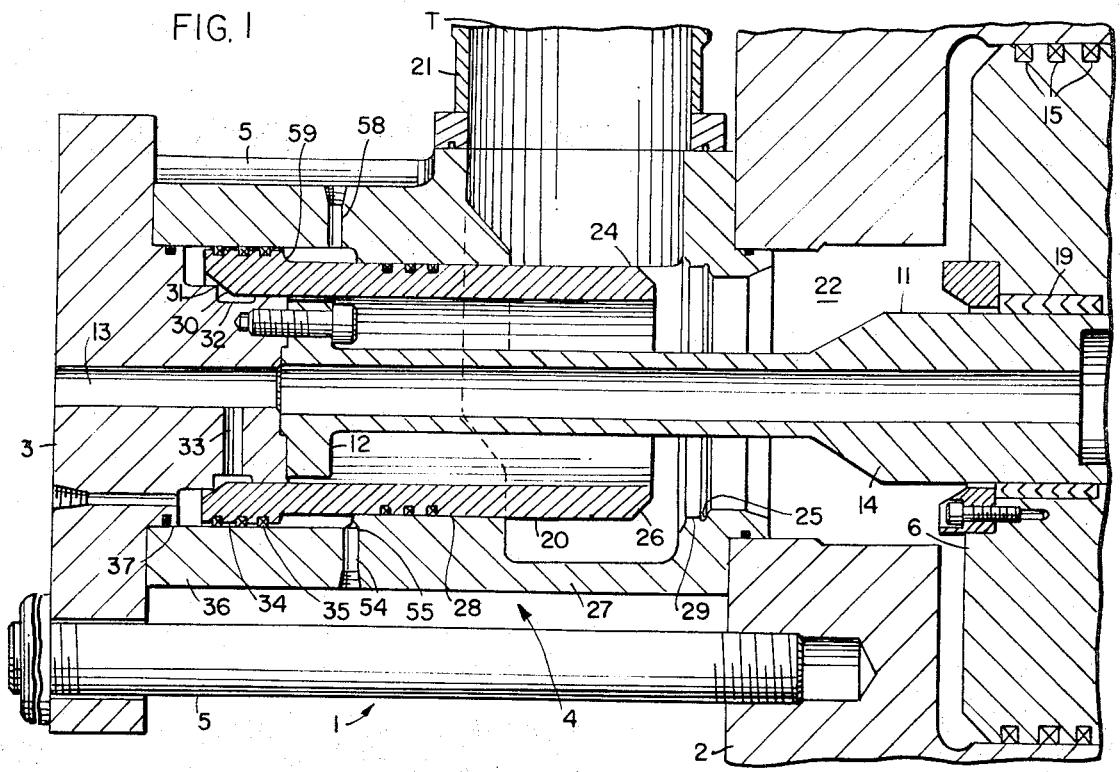

A poppet 20 surrounds the jack ram at one end thereof and is adapted to be shifted axially within the valve cylinder 4 between the open position thereof as shown in FIGS. 1 and 3, and the closed position thereof as shown in FIGS. 2 and 4. A pipe or conduit 21 is connected to a hydraulic fluid reservoir (not shown) at one end thereof and to the prefill valve assembly at the other end thereof so that when the parts are in the idle position and the poppet 20 is open there will be communication between the hydraulic fluid reservoir and the main ram cavity 22 behind the main ram through the conduit 21 and the annular opening 23 between the end 24 of the poppet and its seat 25.

The end 24 of the poppet 20 has an external, annular, angularly disposed seat 26 which is adapted to move into closed position against the similarly angled annular seat 25 provided adjacent one end of the valve cylinder 4. This arrangement may be more clearly understood by viewing FIGS. 1 and 2.

The valve cylinder 4 is provided with a main body portion 27. The inner surface thereof is so contoured as to provide an internal annular guide 28 for the poppet 20. The inner end of the body 27 adjacent the seat 25 is provided with an internal annular rib 29 which has the same diameter as the guiding surface 28. Thus, as will be pointed out more clearly hereinafter, when the poppet is moved toward the closed position the outer surface thereof will reach the internal annular rib 29 and shut off communication between the fluid reservoir and the main ram cavity 22 before it reaches the completely closed position thereof by the seating of the mating annular seats 25 and 26. This will be evident from viewing FIGS. 1 and 2.

The opposite end of the poppet 20 is provided with an internal, annular, angularly disposed seat 30 which is adapted to bear against the annular shoulder 31 formed on the body of the jack ram support 3. At one side of this shoulder 31 there is an annular recess 32 of a smaller diameter than the shoulder so that when the poppet is in its open position as shown in FIG. 1 with the annular seat 30 bearing against the shoulder 31, a part of the seat 30 will be exposed to the annular recess 32.

One or more radially extending passageways 33 connect the passageway 13 in the jack ram support 3 with the annular recess 32. Hydraulic fluid from the main circuit, when directed through the passageway 13 and bore 14, will also enter the passageway 33 and the annular recess 32.

The outer end of the poppet 20 has an external portion 34 of enlarged diameter which is provided with a plurality of sealing rings 35. The outer end 36 of the valve cylinder body 27 has an internal portion 37 of enlarged diameter extending from the internal guiding surface 28. Thus, the poppet is also guided in its axial movement by the surface portion 37.

As indicated hereinabove, rapid closing of the poppet is achieved by hydraulic pressure from the main system. In FIG. 1, it will be noted that when the poppet is open, a part of the valve seat 30 is exposed to the annular recess 32. When hydraulic fluid from the main system flows through bore 13 in the jack ram support and through bore 14 in the jack ram it will move the main ram to its advanced mold-closed position, after which time hydraulic pressure builds up inside of the jack ram and through the port 33. This produces pressure from the main hydraulic system against the exposed portion of poppet seat 30, thereby unseating the poppet when pilot pressure is relieved to tank.

As will be seen presently, when the operation of the main and pilot hydraulic systems are described, the pilot pressure holding the poppet open will be relieved after the main ram reaches its advanced position and the poppet will be moved to closed position by main hydraulic pressure. As soon as the poppet is unseated the fluid will spread over a larger area and movement thereof will be slowed. Also a cushioning effect will occur because one of the ports through which pilot hydraulic fluid flows will be closed by the poppet before the other one.

Furthermore, it is to be noted that when the main ram is fully advanced and the poppet is in closed position, as in FIGS. 2 and 4, both the jack ram cavity 10 and the main ram cavity 22 will be in communication with the same hydraulic fluid supply from the main system. The jack ram cavity 10 is connected to the main fluid supply through bores 13 and 14, whereas the main ram cavity 22 will be connected to the main fluid supply through bore 13, port 33 and the annular space 38 between the outer end 12 of the jack ram and the inner surface of the poppet. This latter connection does not occur, however, until after the seat 30 on the outer end of the poppet moves past the inner end 39 of the jack ram support. The dimensions of the various parts of the valve are such that, as the poppet moves toward closed position the inner end 24 thereof will reach the internal annular rib 29 and shut off communication between the fluid reservoir and the main ram cavity through conduit 21 before the seat 30 on the other end thereof clears the inner end of the jack ram support to connect the main ram cavity with the main hydraulic system.

This condition prevails, with the poppet closed and both the main ram cavity and jack ram cavity in communication with the main hydraulic system, until the curing cycle is completed, at which time the parts return to the idle position and the mold is open in readiness for the next cycle.

The hydraulic systems which control the operation of the main ram and prefill valve are illustrated diagrammatically and include generally a prefill control valve 40 and a ram control valve 41. The prefill valve includes a pilot valve or spool 42 and a main valve or spool 43. The ram control valve includes a pilot valve or spool 44 and a main valve or spool 45.

Pilot hydraulic pressure is provided by a pilot system hydraulic pump (not shown) and is delivered to the pilot valves 42 and 44. The spools of these valves are shifted to the various positions thereof by suitable solenoid valves. The pilot pressure flowing through these pilot valves act to cause a shifting of the main spools 43 and 45, whereupon main hydraulic pressure created by a main hydraulic system pump (not shown) is delivered to suitable points for actuation of the various parts.

Referring to FIG. 3, as has been noted heretofore, the main ram and prefill valve are in their idle position. In this condition of the systems pilot pressure has been delivered through lines 46 and 47, through the ports P and A in the valve 42, and thence through line 48, thereby causing a shifting of the main spool 43 toward the left as viewed in the drawing. In this position of the main spool 43 pilot hydraulic pressure is delivered through line 49 and through ports P and A in the main spool 43 through line 50, check valve 51 and lines 52 and 53 to the port 54 and into the annular space 55 between the poppet 20 and the prefill valve cylinder 27.

This same pilot pressure is also delivered from line 50 through lines 56 and 57 to port 58 and into the same annular space 55. This pilot hydraulic pressure is exerted against the annular shoulder 59 adjacent the outer end of the poppet 20, thereby urging the poppet to its open position as shown in FIGS. 1 and 3. It will be noted that the port 58 is offset axially from the port 54 leading to the annular space 55 so that as the poppet is moved toward closed position port 58 will be closed before port 54, thereby providing a cushioning effect for the rapid closing of the poppet.

In this position of the parts and the valves it will also be noted that any main system hydraulic pressure which had been exerted against the outer end of the poppet when it was in closed position is now relieved by reason of the fact that movement of the poppet to open position forces hydraulic fluid outwardly through the lines 60, 61, 62 and 63 through the ports B and T of the main spool 43 and back to the tank of fluid reservoir.

Also in this idle position of the parts the pilot valve 44 and main spool 45 in the ram control valve 41 will be in their positions as shown in FIG. 3. In this neutral position of the pilot valve 44, pilot hydraulic pressure will be delivered through line 64, through ports P and A and to one end of the main spool 45 through lines 65 and 66. At the same time the pilot hydraulic pressure will be delivered to the other end of main spool 45 through ports P and B in the pilot valve 44 and lines 67 and 68, thereby maintaining the main spool in its neutral position. Hydraulic fluid from the main system will flow through line 69 and into port P in the spool, then out of port T back to the tank through line 70.

Main hydraulic pressure will already have been delivered to the annular space 17 between the main ram 6 and the main cylinder 2 through port 71 from lines 72, 73 and 74, but since in the neutral position of the main spool 45 ports A and B are closed, the hydraulic fluid will be maintained in the annular space 17 to keep the main ram 6 in its retracted mold-opened position.

When the main ram 6 was moved to its retracted position, main hydraulic pressure against the ram through the bores 13 and 14 are relieved and in the positions of the valves as shown in FIG. 3 this hydraulic fluid was delivered through lines 75, 76, 77, 78 and check valve 79 to line 69 which returned it to tank.

When it is desired to close the mold and cycle, the machine solenoid valve SV8B will be energized, thereby shifting pilot valve 44 toward the left as shown in FIG. 4. As may be observed, this will direct the pilot hydraulic pressure through the ports P and B of the pilot valve 44 from line 64 and thence through lines 67 and 68 to the main spool 45, shifting it toward the left to the position shown in FIG. 4. In this position the main hydraulic pressure is directed from the main supply and through line 69 through ports P and B of the main spool, and then through lines 80, 81, 78, 77, 76 and 75 where it is delivered through the bores 13 and 14 into the jack ram cavity 10, thereby moving the main ram 6 to its advanced mold-closed position.

It will be evident that simultaneously with the shifting of the main spool 45 to the position shown in FIG. 4 the hydraulic pressure in the annular space 17 holding the main ram retracted will be relieved by allowing the fluid to be delivered through the lines 72 and 73 and through the choke valve 82 to line 74 through ports A and T and back to the tank.

After the main ram has reached its advanced mold-closed position solenoid valve SV3 will be energized and will shift the pilot valve 42 to the position shown in FIG. 4 where pilot pressure is delivered through lines 46 and 47 through ports P and B to the other end of the main spool 43, thereby shifting it toward the right. In this position of the spool 43 the ports P and B are closed, and pilot pressure which has been holding the poppet 20 open will now be relieved by directing the fluid therein outwardly through the ports 54 and 58 and their respective lines, and through ports A and T in the main spool 43 back to the tank.

During this time, as noted hereinabove, the main hydraulic pressure has been building up inside of the jack ram whereupon fluid pressure against the seat 30 of the poppet will unseat the poppet and move it toward closed position. As described hereinabove, when the poppet is unseated the fluid will spread over a larger area and slow down the movement thereof, and its movement will be cushioned by first closing off port 58 while port 54 is still open. Also, communication between the tank or fluid reservoir and the main ram cavity through conduit 21 will be shut off when the inner end of the poppet reaches the inner annular rib 29 in the valve cylinder 27. Continued movement of the poppet to closed position, where its seat 26 comes against the annular seat 25, will open communication between the main hydraulic system and the main ram cavity as heretofore explained.

After the work cycle is completed an electric cure timer of well known construction deenergizes SV3, thereupon moving the pilot valve 42 back to the position shown in FIG. 3 connecting ports P and A therein and moving the main spool 43 to connect its ports P and A directing fluid pressure against the poppet shoulder to move it back toward open position. As heretofore noted, this movement also connects the ports B and T in the main spool 43, thereby relieving the pressure ahead of the poppet.

Also, at this point SV8B is also deenergized and SV8A is energized thereupon connecting ports P and A in the pilot valve 44 as shown in FIG. 5. This directs the pilot pressure to shift the main spool 45 toward the right connecting the ports P and A therein whereupon main hydraulic pressure is directed through line 74, check valve 83, lines 73 and 72, through the port 71 and into the annular space 17 to retract the main ram. In the position of the valves in FIG. 5 it will be noted also that the ports B and T of the main spool are connected for directing fluid back to the tank from the jack ram cavity through lines 76, 77, 81 and 80.

When the ram returns to its normal retracted position a limit switch is actuated to deenergize SV8A, thereby returning all spools to the idle position as shown in FIG. 3.

From the foregoing it will be apparent that a novel arrangement has been provided in prefill valves for injection molding machines wherein main hydraulic fluid pressure is utilized to move the poppet to closed position, thereby enabling this to take place much more rapidly than has been possible heretofore, and resulting in a considerable decrease in the required cycle time and consequent increase in production.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. In a molding machine having a pilot hydraulic circuit and a main hydraulic circuit, a main cylinder, a main ram reciprocable therein between advanced, mold-closed, position and retracted, mold-open, position, the volume in said cylinder behind said main ram constituting a main ram cavity, a jack ram cavity in said main ram, a stationary jack ram mounted at the outer end thereof on a jack ram support and the inner end thereof extending into said jack ram cavity in said main ram, a hydraulic fluid supply in communication with said main ram cavity when said main ram is retracted, a bore extending through said jack ram adapted to have communication with the main hydraulic circuit, whereby main hydraulic pressure through said bore will move said main ram toward advanced position, a prefill valve assembly including a valve cylinder extending between said main cylinder and said jack ram support and a poppet surrounding said jack ram and reciprocable in said valve cylinder between a closed position wherein communication between said fluid reservoir and said main ram cavity is shut off, and an open position wherein communication between said fluid reservoir and said main ram cavity is open, means for urging said poppet toward open position, and means for directing hydraulic pressure from said main hydraulic circuit into said valve cylinder and against one end of said poppet for initiating and maintaining its movement to closed position.

2. The combination of elements defined in claim 1, wherein said means for urging said poppet toward open position is pilot hydraulic pressure, and there are means for relieving said pilot hydraulic pressure when said main ram reaches the advanced, mold-closed, position.

3. The combination of elements defined in claim 1, wherein said means for urging said poppet toward open position is pilot hydraulic pressure, and switch means operable when said main ram reaches the advanced, mold-closed, position thereof to relieve said pilot hydraulic pressure.

4. The combination of elements defined in claim 1, wherein said main ram cavity and said jack ram cavity are both in communication with the main hydraulic circuit when said poppet is closed.

5. The combination of elements defined in claim 4, wherein said poppet and said valve cylinder are so related that movement of the poppet to closed position will close communication between said hydraulic fluid reservoir and said main ram cavity before opening communication between said main ram cavity and the main hydraulic circuit.

6. In a molding machine having a pilot hydraulic circuit and a main hydraulic circuit, a main cylinder, a main ram reciprocable therein between advanced, mold-closed position, and retracted, mold-open position, the volume in said cylinder behind said main ram constituting a main ram cavity, a jack ram cavity in said main ram, a stationary jack ram mounted at the outer end thereof on a jack ram support and the inner end thereof extending into said jack ram cavity in said main ram, a hydraulic fluid reservoir in communication with said main ram cavity when said main ram is retracted, a bore extending through said jack ram adapted to have communication with the main hydraulic circuit, whereby main hydraulic pressure through said bore will move said main ram toward advanced position, a prefill valve assembly including a valve cylinder and a poppet around said jack ram reciprocable within said valve cylinder between open and closed positions, an annular shoulder on said jack ram support providing a seat for one end of said poppet when in the open position thereof, an annular seat on said valve cylinder for the other end of said poppet when in the closed position thereof, an annular recess in said jack ram support adjacent said one end of said poppet, a passageway between said bore and said annular recess, hydraulic pressure from the said pilot hydraulic circuit normally urging said poppet toward open position when said main ram is retracted, and means for relieving the pilot hydraulic pressure against said poppet when main hydraulic pressure has advanced said main ram to mold-closed position, whereby hydraulic pressure from the main hydraulic circuit through said bore and said passageway against said one end of said poppet will rapidly move said poppet to closed position and shut off communication between said reservoir and said main ram cavity.

7. The combination of elements defined in claim 6, wherein said poppet and said valve cylinder are so arranged that, when said poppet is in closed position, both said bore and said main ram cavity are in communication with the said main hydraulic circuit.

8. The combination of elements defined in claim 7, wherein movement of said poppet to closed position will shut off communication between said main ram cavity and said hydraulic fluid reservoir before opening communication between said main ram cavity and the main hydraulic circuit.

* * * * *